United States Patent [19]
Dupuy

[11] 3,732,506
[45] May 8, 1973

[54] IMPULSE DURATION MODULATOR

[75] Inventor: Michel Jean-Marie Dupuy, Livry-Gargen, France

[73] Assignee: Roussel-Uclaf, Paris, France

[22] Filed: Feb. 2, 1971

[21] Appl. No.: 111,984

[30] Foreign Application Priority Data

Feb. 10, 1970 France ................................7004580

[52] U.S. Cl. ......................332/9 T, 307/265, 328/58, 331/113 R, 332/14

[51] Int. Cl. ..............................................H03k 7/08

[58] Field of Search ......................332/9, 9 T, 14, 16, 332/16 T; 331/113 R; 307/265–267; 328/58; 325/142

[56] References Cited

UNITED STATES PATENTS

| | | | |
|---|---|---|---|
| 3,258,605 | 6/1966 | Clark | 328/58 X |
| 3,448,296 | 6/1969 | Schwaninger | 307/267 |
| 3,065,432 | 11/1962 | Duncan | 332/16 T X |
| 3,484,624 | 12/1969 | Rasiel et al. | 328/58 X |
| 3,531,740 | 9/1970 | Camenzind | 331/113 R X |

*Primary Examiner*—Alfred L. Brody
*Attorney*—Bacon & Thomas

[57] ABSTRACT

An impulse modulator including a monostable multivibrator having a charging capacitor, a voltage comparator, a constant current generator and first and second modulating voltage sources. The voltage comparator insures that the multivibrator rapidly changes from its astable state to its stable state, and the duration of the astable period is proportional to the ratio of the first modulating voltage, and a constant voltage, to a second modulating voltage. Two modulators may be combined in an anticoincidence circuit to make the combined modulator output strictly proportional to the ratio of the first and second modulating voltages.

5 Claims, 4 Drawing Figures

INVENTOR

MICHEL JEAN-MARIE DUPUY

BY Bacon & Thomas

ATTORNEYS

IMPULSE DURATION MODULATOR

BACKGROUND OF THE INVENTION

1. Field of the Invention

The present invention relates to impulse duration modulators dependent on the instantaneous value of at least one modulating voltage.

2. Description of Prior Art

Modulators of this type are known, consisting of a monostable multivibrator, which releases impulses whose duration is determined by the charge on a capacitor which keeps the multivibrator in its astable position.

In order to make the impulse duration transmitted by the multivibrator proportional to an almost constant modulating voltage, the capacitor is charged linearly as a function of time by using a constant current generator. One then compares the capacitor voltage to the modulating voltage by means of a comparator which restores the multivibrator to its stable state when the capacitor voltage reaches the modulating voltage.

Similar modulators are described in U.S. Pat. Nos. 3,484,624 and 3,258,605 and in French Pat. No. 1,444,711.

SUMMARY OF THE INVENTION

The purpose of the invention is to obtain an impulse whose duration is proportional to the ratio of two modulating voltages.

This can be achieved by improving the circuit described above and by adding a voltage-to-current convertor in order to make the current furnished by the current generator, which charges the capacitor, proportional to a second modulating voltage. Thus, the multivibrator, triggered by an activating impulse, produces a pulse whose duration is proportional to the ratio of the first modulating voltage (and a constant voltage), and the second modulating voltage.

A pulse duration which is strictly proportional to the ratio of the two modulating voltages is obtained by combining two modulators as described above in an anticoincidence circuit. The second modulating voltage is applied to both voltage-to-current convertors of the two modulators. The first modulating voltage is applied to the comparator of the first modulator whereas a constant voltage, such as ground potential is applied to the comparator of the second modulator.

BRIEF DESCRIPTION OF THE DRAWINGS

Other characteristics and advantages of the invention will become apparent from the description and drawing, given purely by way of example, wherein.

DETAILED DESCRIPTION OF THE DRAWINGS

Detailed Description of Prior Art

Figures 1, 2:
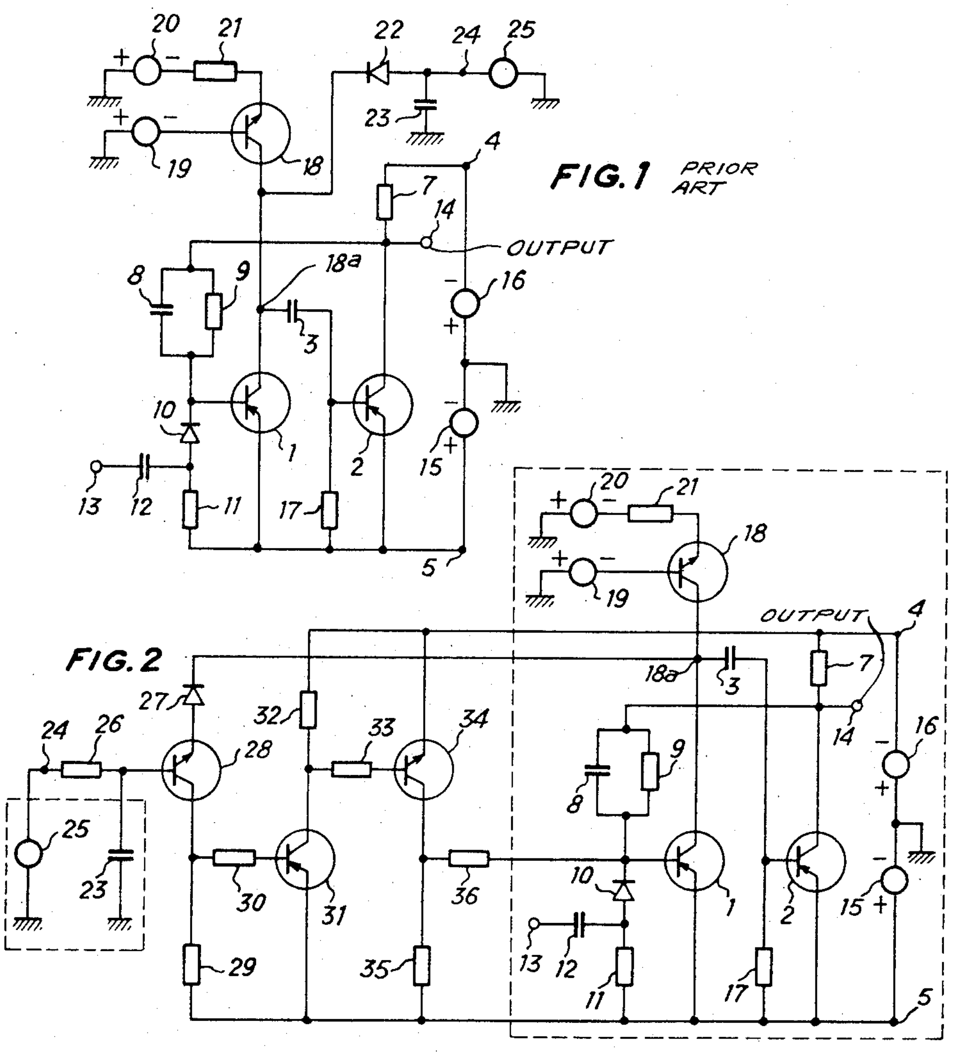
FIG. 1 PRIOR ART, FIG. 2
FIG. 1 represents the electric diagram of an impulse duration modulator of a known type.
FIG. 2 represents the electric diagram of an improved impulse duration modulator according to the invention.

The modulator of a known type represented in FIG. 1 comprises principally a monostable multivibrator having two transistors 1, 2, whose stable and astable states correspond respectively to the cut-off conditions of the transistors 2 and 1. The return of the multivibrator from the astable state to the stable state and consequently the duration of the output impulse from the modulator to the terminal 14 depends on the charging time of the capacitor 3 connected between the collector of the transistor 1 and the base of the transistor 2.

In order to obtain good linearity of the charging time of the capacitor 3, this is charged by means of a constant current generator comprising a transistor 18 of NPN type whose collector is connected to the common point 18a of the collector of the transistor 1 with the left-hand plate of the capacitor 3. The base of the transistor 18 is connected to the negative pole of a voltage source 19 negative with respect to ground. The emitter of the transistor 18 is connected through a resistance 21 to the negative pole of another voltage source 20 larger than the source 19 and whose positive terminal is connected to ground.

In such an arrangement, functioning in a known manner, as a constant current generator, the charge on the capacitor 3 is determined by the current crossing the emitter collector gap of the transistor 18. The charge on the condenser 3 is continued until the voltage of the capacitor reaches that of the source 19. The variation in voltage resulting from the leakage of the charge through a resistance 17 connected between the right-hand plate of the capacitor 3 and the emitter of the transistor 2 causes a modification of the voltage of the base of the latter which is sufficient to suppress the transistor 2. In order to make the instant of triggering independent of the voltage values of the power supply sources 15, 16 of the multivibrator and 19, 20 of the constant current generator which otherwise would have to be stabilized, the modulator of FIG. 1 comprises in addition a separate source connected to the collector of transistor 18 by means of a voltage comparator, which compares the voltage of the collector of the transistor 1 with the instantaneous value of the modulation voltage. This comparator comprises a diode 22 and a capacitor 23 mounted in series, the point 24 common to these two elements being connected to a terminal of the modulating voltage source 25, the other terminal of this source being led to ground. The source 19 is selected in a manner to supply a voltage whose value is greater than the maximum voltage of the source 25, so that as soon as the voltage at the terminals of the capacitor 3 reaches the instantaneous value of the voltage of the source 25, the diode 22 starts to conduct, and a part of the constant current supplied by the transistor 18 serves to charge the capacitor 23.

There results a drop in the current through the resistance 17 which is sufficient, by means of a suitable proportioning of the components, to assure the reversion of the circuit in its stable position.

An inconvenience of the installation, which has just been described, is that in order for the transistor 2 to be well saturated, such that the voltage on the output terminal 14 is equal to the voltage of the positive terminal 5 of the source 15, it is necessary for whatever elements are used and conditions employed that the base of transistor 2 be supplied by a current greater than the ratio of its collector current to its current gain. The collector current is given by the formula:

$$I_{c2} = (V_{16} + V_{15})/R_7$$

and the current gain is a parameter characteristic of each transistor and, even in similar types of transistors, varies from one to another over fairly wide limits. In order to have the certainty that any transistor of a given type will supply the current $I_{c2}$, under whatever conditions it is used, one is led to take a current gain less that that of the worst transistors. For this current gain, one then chooses the resistance 17.

At the time of the coincidence between the saw-tooth voltage at 18*a* and that of the modulation voltage from the source 25, part of the current passing into the capacitor 3 and supplying the base current to the transistor 2, is supplied through the diode 22 to charge the capacitor 23. The reversion of the multivibrator is produced only when the transistor 2 ceases to be saturated. This occurs when its base current is no longer sufficient to supply the collector current $I_{c2}$ previously defined, bearing in mind the current gain suitable for the transistor 2 in question.

The time which lapses between the coincidence of the two voltages and that where the transistor 2 is desaturated effects the "oscillation moment," and introduces an error into that moment, an error which is not the same according to the transistor 2 in use.

Moreover, when the charging current of the capacitor 23 is deducted from the charging current of the capacitor 3, the slope of the saw-tooth which can be measured on the collector of the transistor 18 decreases, causing an additional imprecision of the "oscillation moment" of the transistor 2. Another inconvenience of the arrangement described lies in the fact that, in order to derive across the diode 22 a current sufficient to make the multivibrator oscillate, it is necessary for the capacity of the capacitor 23 to be greater than that of the capacitor 3. Since the current supplied by the source comprises only leakage currents from the capacitor 23 and from the inversely polarized diode 22, the input impedance of such an arrangement, from the point of view of the modulation supply 25, is always very large. This impedance is not the same as the dynamic impedance since the capacitor 23 acts as a short circuit.

Description of the Preferred Embodiments

FIG. 2 represents the electric diagram of an impulse duration modulator according to the invention, in which the abovementioned inconveniences are remedied.

The parts common of the modulator of FIG. 1 and to the modulator according to the invention are surrounded by dotted outlines and their components have the same reference numbers as those of the corresponding elements of the circuit of FIG. 1.

FIG. 2 shows again the monostable multivibrator having transistors 1, 2 of the PNP type, the collector of the transistor 1 being connected to the base of the transistor 2 by the capacitor 3 whose right-hand plate is connected to the emitter of the transistor 2 by the resistance 17. The transistors 1 and 2 are fed by two voltage sources 15, 16 connected so that the positive terminal of the source 16 and the negative terminal of the source 15 are grounded. The positive terminal of the source 15 is connected directly to the emitters of the transistors 1 and 2 and to the base of the transistor 1 by means of a diode 10 and of a resistance 11 in series. The point common to the diode 10 and to the resistance 11 is connected by means of a capacitor 12 to the input terminal 13 of the modulator to which the impulses to be modulated are applied.

The negative terminal of the source 16 is connected to the collector of the transistor 2 by a resistance 7, the point common to this latter and to the collector of the transistor 2 being the output terminal 14 of the modulator. Terminal 14 is connected to the base of the transistor 1 by a capacitor 8 and a resistance 9 mounted in parallel.

This assembly shows also the constant current source constituted by the transistor 18 of NPN type, whose collector is connected to the collector of the transistor 1, of which the base is connected to the negative pole of a constant voltage source 19 and of which the emitter is connected to the negative pole of a constant voltage source 20 by means of a resistance 21.

The positive terminals of the sources 19 and 20 are connected to ground.

The modulating voltage is also supplied to the modulator by a source 25, but in order to increase the dynamic impedance of the assembly, in view of this source, a charging resistance 26 is mounted between the source and the capacitor 23, connected to ground.

The value of the resistance 26 must be as high as possible in order not to charge the source, but it must not be too large since it forms, with the capacitor 23, an RC circuit of which the time constant delays the appearance, at the point 24, of modulation signal variations from the source 25.

The necessity of having a capacitor 23 having a capacity which is high with relation to that of the capacitor 3 necessitates making a compromise between the dynamic input impedance and the speed of the reversion.

The problems posed by the choice of current gain by the transistor 2 with a view to obtaining satisfactory working on the one hand and the passage into the capacitor 23 of a part of the current supplied to the capacitor 3 on the other hand are solved, according to the invention, in the following manner.

The diode 22 of the arrangement shown in FIG. 1 is replaced by a semi-conductor device such as, for example, the emitter-base electrodes of a transistor 28 of the NPN type.

The emitter of the transistor 28 is connected to the point 18a, common to the collectors of the transistors 18 and 1, by means of a diode 27 arranged to prevent the breakdown of the base-emitter junction 28, reverse biased until the voltage at the point 18a reaches the voltage at the point 24.

The collector of the transistor 28 is connected to the positive terminal 5 of the source 15 by a resistance 29 and to the base of an amplifying transistor 31, of PNP type, for example, by a resistance 30. The emitter of the transistor 31 is connected to the positive terminal of the source 15, whilst its collector is connected to the negative terminal 4 of the source 16 by a resistance 32 and to the base of a second amplifying transistor 34, of the NPN type for example, by a resistance 33. The emitter of the transistor 34 is connected to the terminal 4 while its collector is connected to the terminal 5 by a resistance 35 and to the base of the transistor 1 of the multivibrator by a resistance 36.

As soon as the voltage at the point 18a reaches the voltage at the point 24 the transistor 28 starts to conduct. The current required to charge the capacitor 23 is equal to that collected in the capacitor 3, divided by the current gain of the transistor 28; the capacity of the capacitor 23 can then be divided all the while maintaining the same effect on the current of the capacitor 3. It therefore becomes possible either to multiply the dynamic input resistance $R_{26}$ maintaining a similar charging time constant $R_{26} \cdot C_{23}$ or, while maintaining the same value in the resistance 26 to divide the charging time constant by the current gain of the transistor 28.

The charge collected from the charging current in the capacitor 3 causes a voltage to appear on the collector of transistor 28 which approaches the voltage of terminal 18*a* (although it is equal to the voltage at terminal 5 as long as the voltage at point 18*a* is less than the voltage at point 24 in absolute value).

This voltage is applied to the base of the transistor 31, which amplifies it. The collector voltage of the transistor 31, which was equal to the voltage at the point 4 before coincidence of the voltages at the points 18*a* and 24, approaches the voltage at the point 5. This voltage is applied to the amplifying transistor 34, which amplifies it in turn. The collector voltage of the transistor 34, equal to that at the point 5 before coincidence, approaches the voltage at the point 4.

It is this voltage which drives the base of the transistor 1 and causes it to conduct while producing the reversion of the multivibrator in its stable state. The gain of the transistors 28, 31 and 34 thereby accelerates the oscillation of the monostable multivibrator removing the imprecision which is present with a simple diode.

The improved impulse duration modulator according to the invention can particularly supply impulses in proportion to the ratio of two voltages.

Such working is achieved considering the voltage from the source 25 (FIG. 2) as a dividend voltage and making the current from the constant current sawtooth voltage generator 18, 19, 20 proportional to the voltage of a source 37 (FIG. 3) as a "divisor".

Figure 3:
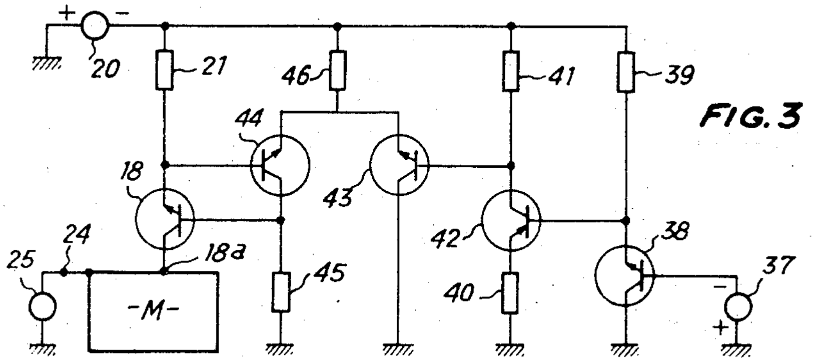
FIG. 3 represents the electric diagram of an additional circuit arranged to permit the assembly of FIG. 2 to operate as an impulse duration modulator depending on the ratio of two distinct modulating voltages.

To this effect a voltage-current convertor of which the electric diagram is shown in FIG. 3 is associated with the modulator of FIG. 2.

In FIG. 3 the non-modified parts of the modulator of FIG. 2 are represented by the block M.

The block M is connected to the modulation voltage source 25 regarded here as a dividend voltage source. At the point 18*a* of the block M is connected one electrode of a semiconductor device, for example, the collector of transistor 18. A second electrode, such as an emitter of transistor 18, is connected to the negative pole of the supply 20 by means of the resistance 21. A third electrode, the base of the transistor 18, is now connected to a second modulating voltage source, a "-divisor" voltage source 37 by means of a voltage-current conversion device.

This device comprises a first transistor 38 of the NPN type for example, of which the base is connected to the negative pole of the source 37, the positive pole of the latter being connected to ground. The collector of the transistor 38 is connected to ground and its emitter is connected, by means of a resistance 39, to the negative pole of the source 20. The collector of the transistor 38 is, moreover, connected to the base of a second transistor 42 of PNP type for example, of which the emitter and the collector are respectively connected to ground and to the negative pole of the source 20 by means of resistances 40 and 41. The collector of the transistor 42 is, moreover, connected to a third transistor 43 of NPN type for example, of which the collector is connected to ground and of which the emitter is connected from one branch to the negative pole of the source 20 by means of a resistance 46 and from another branch to the emitter of a fourth transistor 44 of NPN type. Transistor 44 and 43 constitute a differential amplifier. The collector of the transistor 44 is connected to ground by a resistance 45. Furthermore, the base and the collector of the transistor 44 are connected, respectively, to the emitter and to the base of the transistor 18.

The time interval determined for a constant current Io supplied to the output of the transistor 18 is given by the formula:

$$t_1 - t_0 = C_3/Io\,(V_{25} + E)$$

in which $t_0$ = the initial instant $t_1$ = the instant of return to the stable state $E$ = the reference voltage of the source 15 applied to the circuit (FIG. 2)

$C_3$ = the capacity of the capacitor 3 of the modulator.

If the current supplied by the transistor 18 is made proportional to the dividing voltage from the source 37, e.g., the "divisor" voltage, $$I = k\, V_{37}$$

one obtains $$t_1 - t_0 = C_3\,(V_{25} + E)/(k\, V_{37})$$

Of course, the voltage from the source 37 must be constant throughout the duration of the measuring.

The assembly of FIG. 3 works in the following manner:

A voltage in phase and equal to $V_{37}$ (less a specific constant determined by the base-emitter voltage drop of the transistor 38) is collected at the terminals of the resistance 39. This voltage drives the transistor 42, which gives to the terminals of the resistance 40 a voltage in phase with $V_{37}$ but of which the signal is opposed to that of the preceding one. There is, therefore, mutual compensation. The current which runs through the resistance 40 is therefor $I_1 = V_{37}/R_{40}$; it runs also through the resistance 41. The voltage at the terminals of the resistance 41 is:

$$R_{41} \times I_1 = (R_{41}/R_{40}) \times V_{37} = \alpha \cdot V_{37}.$$

This voltage drives the differential amplifier constituted by the two transistors 43, 44 of which the output controls the saw-tooth current generator 18 of the previous assembly. The other input of the differential amplifier is controlled by the voltage drop at the terminals of the resistance 21, and therefore proportional to the current $I$ supplied by the generator 18. The amplifier tends, therefore, to equalize the drop in voltage at the terminals of the resistances 21 and 41.

The current I supplied by the generator 18 is therefore $$I = (\alpha \cdot V_{37})/R_{21} = k \cdot V_{37}$$

with $$k = \alpha/R_{21} = (R_{41}/R_{40}) \cdot (1/R_{21}).$$

In selecting the ratio $\alpha$ (if $R_{21}$ is fixed by the working of the general assembly), the desired value of $k$ can be obtained.

At the output of the modulator, impulses are therefore obtained, of which the duration is given by the formula:

$$t_1 - t_0 = \frac{C_3(V_{25}+E)}{\frac{R_{41}}{R_{40}} \cdot \frac{V_{37}}{R_{21}}} = \frac{C_3R_{40}-R_{21}}{R_{41}} \times \frac{(V_{25}+E)}{V_{37}}$$

The duration of the impulses is therefore proportional to the ratio $V_{25}/V_{37}$ but at a specific constant due to the presence of the voltage E in the preceding formula.

Figure 4:
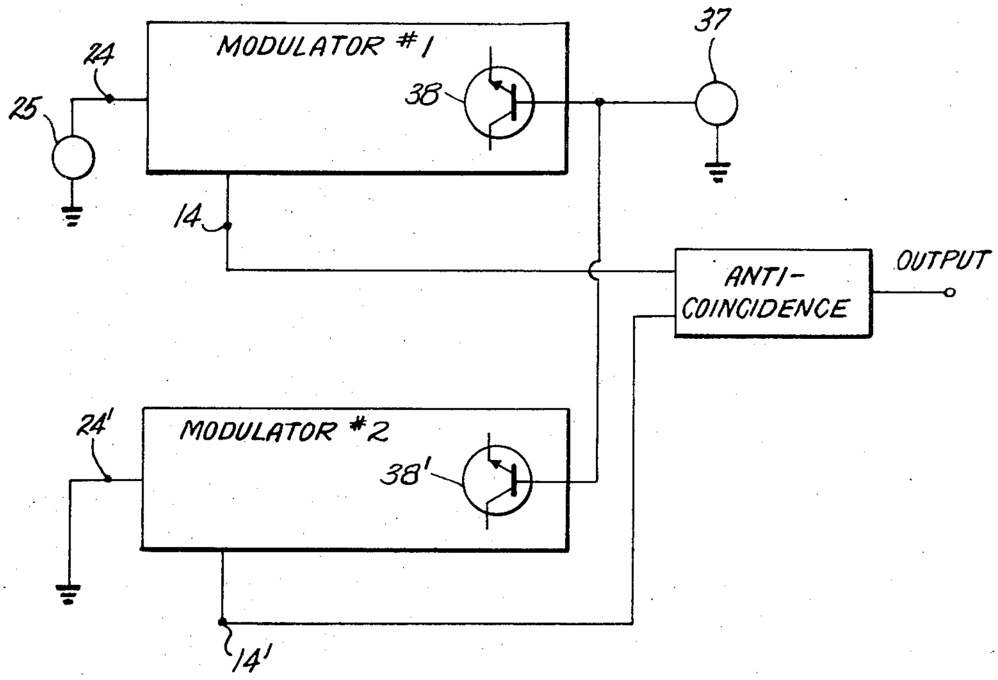
FIG. 4 shows a combined modulator system in which two circuits similar to those shown in FIG. 3 are connected to an anticoincidence circuit.

In order to eliminate this constant (E), a second identical modulator is joined to the first as shown in FIG. 4. Point 24 of the first modulator is connected to the first modulating source 25, while point 24' of the second modulator is connected to a constant voltage such as ground. The second modulating source 37 (the divisor voltage) is connected to the voltage-to-current convertor of both modulators. This is illustrated in FIG. 4 by the connecting line going from the second modulating voltage source 37 to transistors 38 and 38' of the first and second modulators respectively. The first modulator supplies an impulse proportional to the ratio $(V_{25} + E)/V_{37}$ whereas the second modulator supplies an output pulse whose duration is proportional to the ratio $E/V_{37}$. The outputs 14 and 14' of both modulators are fed to first and second input terminals of an anticoincidence circuit. This anticoincidence circuit supplies a pulse output whose duration is proportional to the difference between the first and second input pulses from the first and second modulators. Thus, the anticoincidence output pulse duration is proportional to the ratio $V_{25}/V_{37}$.

Of course, a similar assembly can be produced when the device is used as an impulse duration modulator depending on a single modulation voltage.

In the various circuits which have just been described a certain number of NPN and PNP transistors suitably connected and polarized according to their type of conductivity have been used. It goes without saying that by means of a certain number of polarity inversions of the supply sources used, transistors of one given type of conductivity can be replaced by transistors of an opposite type of conductivity, without altering the performance of the device.

Moreover, use, in the assembly described, of complete amplifiers or comparators produced according to the technique of integral circuits, would not modify in any way its principle.

What is claimed is:

1. An impulse modulator comprising:

a. a monostable multivibrator having a stable and an astable electrical state and including a charging capacitor, an input, an output and a power supply having voltage E, b. a constant current generator having an output for charging said capacitor, c. a voltage comparator connected to said constant current generator output, d. a first voltage source, supplying a first modulating voltage, $V_1$, and connected to said comparator, said comparator triggering said monostable multivibrator back to its stable state as soon as the voltage on said capacitor reaches the instantaneous value of said first modulating voltage, e. voltage-to-current converting means having an input terminal and an output terminal, said output terminal connected to said constant current generator, f. a second voltage source, supplying a second modulating voltage, $V_2$, and connected to said input terminal of said voltage-to-current converting means, whereby the duration of the impulse from said output of the monostable multivibrator is proportional to the ratio $(V_1+E)/V_2$.

2. An impulse modulator as recited in claim 1 wherein said constant current generator comprises a transistor having a collector connected to said comparator and a base connected to said output terminal of said voltage-to-current converting means.

3. An impulse modulator as recited in claim 1 wherein said voltage-to-current converting means comprises a differential amplifier.

4. An impulse modulator as recited in claim 1 wherein said constant current generator comprises a semi-conductor device having a first electrode connected to said comparator and a second electrode connected to said output terminal of said voltage-to-current converting means.

5. An impulse modulator comprising:

a. a first monostable multivibrator having a stable and an astable electrical state and including a charging capacitor, an input, an output and a power supply having voltage E, b. a first constant current generator having an output for charging said capacitor, c. a first voltage comparator connected to said first constant current generator output, d. a first voltage source, supplying a modulating voltage $V_1$ and connected to said first voltage comparator, said first voltage comparator triggering said first monostable multivibrator back to its stable state as soon as the voltage on said capacitor of said first monostable multivibrator reaches the instantaneous value of said first modulating voltage, e. a first voltage-to-current converting means having an input terminal and an output terminal, said output terminal connected to said first constant current generator, f. a second voltage source, supplying a modulating voltage $V_2$ and connected to said input terminal of said first voltage-to-current converting means, whereby the duration of the impulse from said output of the first monostable multivibrator is proportional to the ratio $(V_1+E)/V_2$, g. a second monostable multivibrator having a stable and an astable electrical state and including a charging capacitor, an input, an output and a power supply having voltage E, h. a second constant current generator having an output for charging said capacitor of said second monostable multivibrator, i. a second voltage comparator connected to said second constant current generator output and to ground potential, j. a second voltage-to-current converting means having an input terminal and an output terminal, said output terminal connected to said second constant current generator and said input terminal connected to said second modulating voltage source, and k. an anticoincidence circuit having a first input connected to the output of said first monostable multivibrator and a second input connected to the output of said second monostable multivibrator, said anticoincidence circuit having an output pulse whose duration is proportional to the ratio $V_1/V_2$.

* * * * *